(12) United States Patent
Terry et al.

(10) Patent No.: US 9,331,520 B2
(45) Date of Patent: May 3, 2016

(54) INDUCTIVELY COUPLED CHARGER

(75) Inventors: Stephen C. Terry, McKinney, TX (US); Paul Brohlin, Parker, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1121 days.

(21) Appl. No.: 13/334,700

(22) Filed: Dec. 22, 2011

(65) Prior Publication Data
US 2013/0162200 A1    Jun. 27, 2013

(51) Int. Cl.
| | |
|---|---|
| H02J 7/00 | (2006.01) |
| H02J 7/04 | (2006.01) |
| H02J 5/00 | (2016.01) |
| H02J 7/02 | (2016.01) |
| H04B 5/00 | (2006.01) |

(52) U.S. Cl.
CPC .................. *H02J 7/045* (2013.01); *H02J 5/005* (2013.01); *H02J 7/025* (2013.01); *H02J 2007/0096* (2013.01); *H04B 5/0031* (2013.01); *H04B 5/0037* (2013.01)

(58) Field of Classification Search
CPC ............ H02J 5/005; H02J 7/025; H02J 7/045
USPC .......................................................... 320/108
See application file for complete search history.

(56) References Cited

U.S. PATENT DOCUMENTS

| | | | |
|---|---|---|---|
| 6,225,782 B1 | 5/2001 | Mercer et al. | |
| 7,196,911 B2 * | 3/2007 | Takano et al. ............... | 363/21.01 |
| 7,830,115 B2 * | 11/2010 | Wong ..................... | H01M 10/44 |
| | | | 320/108 |
| 8,519,667 B2 * | 8/2013 | Tsai ........................ | H02J 7/025 |
| | | | 320/108 |
| 2008/0258688 A1 | 10/2008 | Hussain et al. | |
| 2009/0256521 A1 | 10/2009 | Mori et al. | |
| 2010/0001685 A1 | 1/2010 | Eastlack | |

FOREIGN PATENT DOCUMENTS

KR      1020080032519      4/2008

OTHER PUBLICATIONS

PCT Search Report mailed Apr. 19, 2013.

* cited by examiner

*Primary Examiner* — Richard V Muralidar
(74) *Attorney, Agent, or Firm* — William B. Kempler; Frank D. Cimino

(57) ABSTRACT

A device includes a charge controller to regulate a battery output voltage based on an input voltage and an input current received from a charging circuit. A loop controller monitors the input voltage and the input current to generate a feedback signal to adjust the input voltage to the charge controller.

11 Claims, 4 Drawing Sheets

INDUCTIVELY COUPLED CHARGER

BACKGROUND

Inductive chargers utilize an electromagnetic field to transfer energy. A charging station sends energy through inductive coupling to an electrical device, which stores the energy in batteries, for example. Inductive chargers typically use a first induction coil to provide an alternating electromagnetic field from within a charging base station, and a second induction coil in a portable device that receives power from the electromagnetic field and converts it back into electrical current to charge the battery. The two induction coils in proximity combine to form an electrical transformer.

SUMMARY

An inductively coupled charger is provided. In one example, a device is provided that includes a charge controller to regulate a battery output voltage based on an input voltage and an input current received from a charging circuit. A loop controller can be provided that monitors the input voltage and the input current to generate a feedback signal to adjust the input voltage to the charge controller.

In another example, a device includes a charge controller to regulate a battery based on an input voltage and an input current received from a charging circuit. A first loop controller monitors the input voltage to generate a first feedback signal to adjust the input voltage to the charge controller. A second loop controller monitors the input current to generate a second feedback signal to adjust the input voltage to the charge controller.

In yet another example, a method is provided. The method includes controlling a battery voltage and current via an inner control loop based on an input voltage and an input current received from a charging circuit. This includes employing a transmitter controller to control the input voltage and the input current in the charging circuit. The method includes employing a first outer control loop to monitor the input voltage and to generate a first feedback signal to adjust the input voltage to the charge controller. The method also includes employing a second outer control loop to monitor the input current and to generate a second feedback signal to adjust the input voltage to the inner control loop.

DETAILED DESCRIPTION

Figure 1:
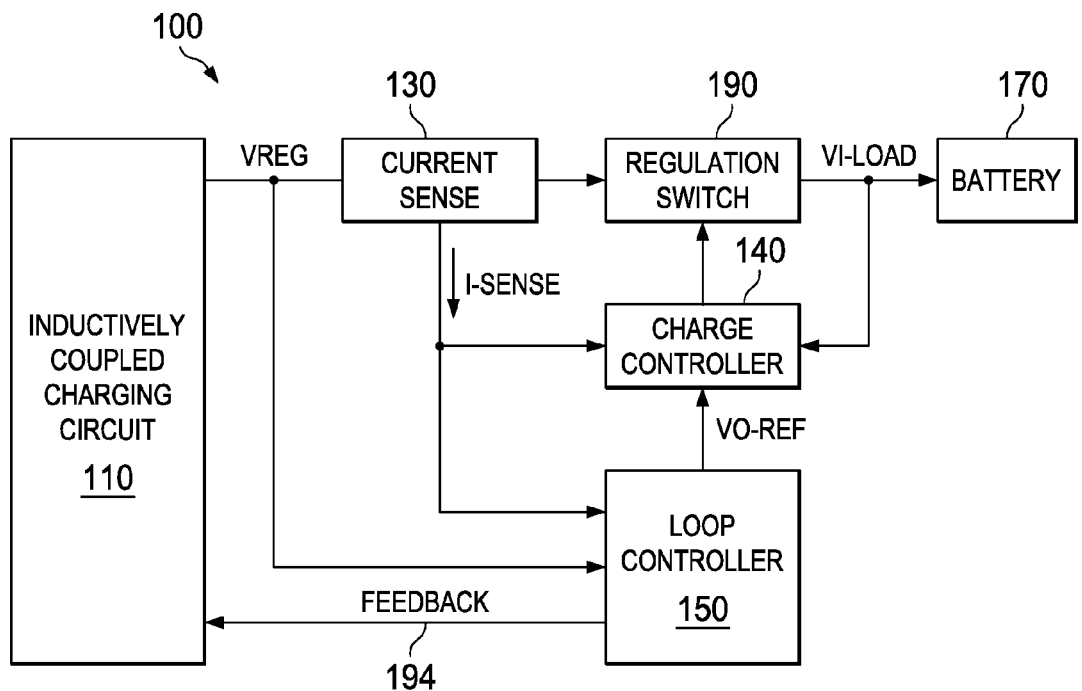
FIG. 1 illustrates an example of an inductively coupled charger device.

FIG. 1 illustrates an example of an inductively coupled charger device 100. The inductively coupled charger device 100 (also referred to as charger device) provides multiple levels of closed-loop voltage, current, and/or temperature control to efficiently control operations of the charger (e.g., wireless cell phone battery charger). The charger device 100 can include an inductively coupled charging circuit 110 (also referred to as charging circuit) that supplies regulated DC power shown as VREG. The charging circuit 110 can include a transformer (not shown) to wirelessly transmit power and can include a transmitter controller (not shown) to control voltage supplied to the transformer. An example of the charging circuit will be described below with respect to FIG. 4. The regulated voltage VREG can be sensed via current sense circuit 130 which supplies current I-SENSE to a charge controller 140 and loop controller 150 that act in conjunction to control a load voltage and current VI-LOAD supplied to a battery 170. The charge controller 140 receives a reference voltage VO-REF from the loop controller 150 while monitoring I SENSE and VI-LOAD. The charge controller 140 controls the load voltage and current VI-LOAD via a regulation switch 190 that supplies both voltage and current to charge the battery 170.

As an example, the charge controller 140 acts as an inner-loop controller for the output voltage and current VI-LOAD whereas the loop controller 150 acts as an outer-loop controller that controls input voltages generated at the charging circuit 110 via feedback 194. Thus, the charge controller 140 and loop controller 150 cooperate with the transmitter controller in the charging circuit 110 to control the output voltage and current VI-LOAD in a closed-loop manner. As shown, the loop controller 150 monitors current from I SENSE and voltage VREG to generate the feedback 194 to the charging circuit 110.

As will be described below with respect to FIG. 3, a second loop controller (not shown) can be added to the charger device 100 to provide additional controls for more efficient generation and control of VI-LOAD at the battery 170. For example, one controller can be dedicated to monitor VREG and generate feedback 194 whereas the second controller can monitor I SENSE and generate a second feedback (not shown) to the charging circuit as will be illustrated and described with respect to FIG. 3.

The charge controller 140 can include discrete devices configured to respond to both current and voltage feedback from I SENSE and the loop controller 150 to control VI-LOAD via the regulation switch 190. The loop controller 150 can include a processor to execute a control algorithm and can include other elements such as an analog-to-digital converter (ADC) (e.g., can be an integrated processor and ADC among other circuit components in the loop controller). The control algorithm can be employed as a global control loop that couples the transmitter and receiver (shown below with respect to FIG. 4), where the transmitter refers to the primary side of the inductively coupled charging circuit 110 and the receiver refers to the secondary side of the charging circuit. In one example, the receiver can monitor and control substantially any variable (e.g., rectifier voltage, output current, and so forth). The receiver can calculate the % difference between the measured control variable, and the target value for the control variable, and sends this value to the transmitter (e.g., % Error=100×(Desired−Actual)/Desired). Upon receiving the % error message via feedback 194, the transmitter can execute a local PID (proportional-integral-derivative) loop which can move a control variable and attempt to shift the measured peak primary current by the error value calculated by the receiver. This can change the power delivered to the receiver, and thus can drive the receiver control variable closer to its target value.

For purposes of simplification of explanation, in the present example, different components of the device 100 are illustrated and described as performing different functions. However, one of ordinary skill in the art will understand and appreciate that the functions of each of the described components can be performed by one or more different components, or the functionality of several components can be combined and executed on a single component.

Figure 2:
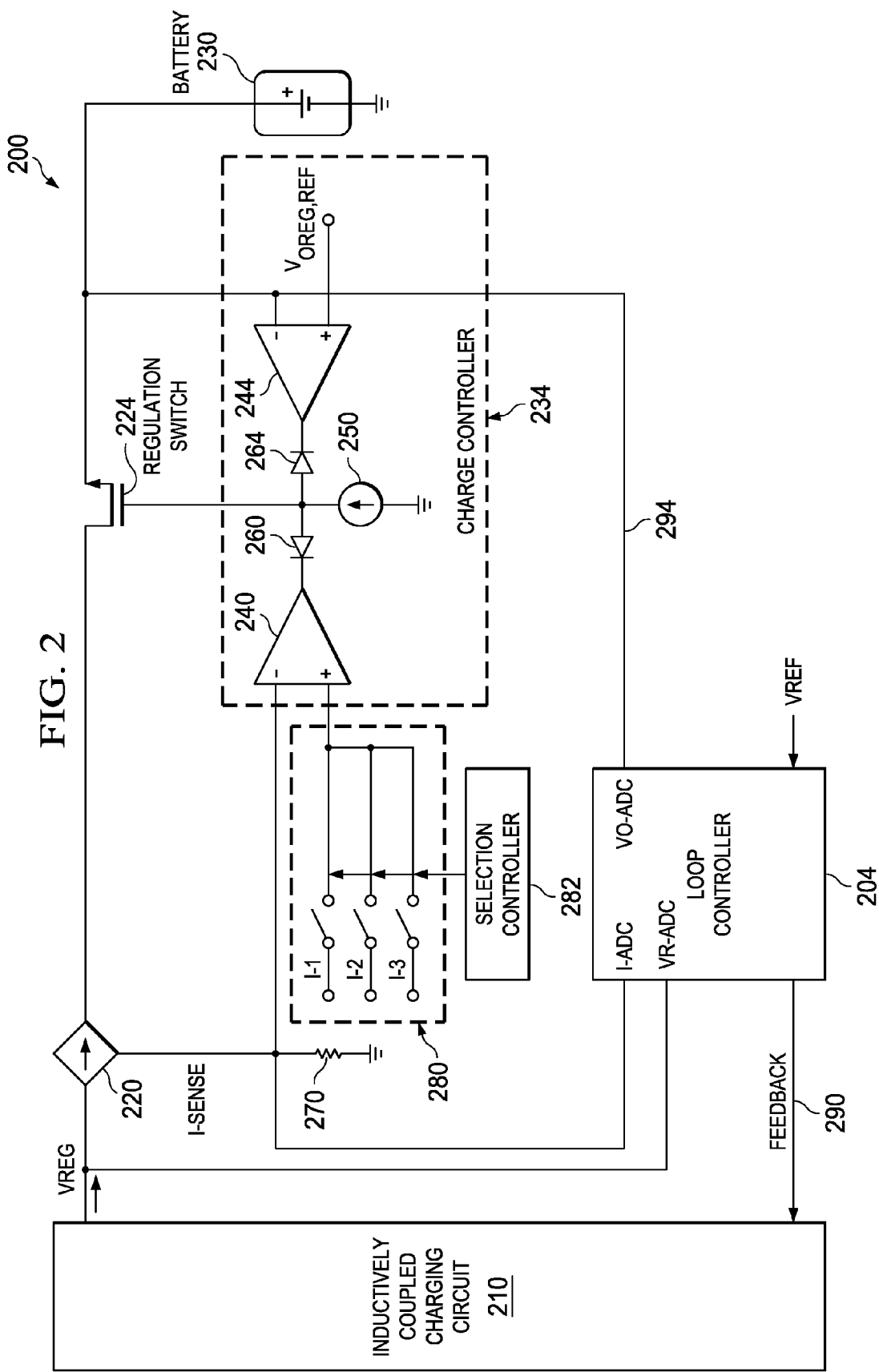
FIG. 2 illustrates an example of an inductively coupled charger device that employs a single outer loop controller to control battery load voltage and current.

FIG. 2 illustrates an example of an inductively coupled charger device 200 that employs a single outer loop controller 204 to control battery load voltage and current. The charger device 200 includes an inductively coupled charging circuit 210 that generates a regulated DC output voltage VREG. A current sense circuit 220 supplies voltage and current to a regulation switch 224 that in turn controls voltage and current delivered to a battery 230. A charge controller 234 controls the regulation switch 224. The charge controller 234 includes an amplifier 240 to monitor sensor signal I-SENSE from current sense 220 and an amplifier 244 that monitors battery output voltage. The charge controller 234 includes a current source 250 (e.g., charge pump) that biases the regulation switch 224. Output from amplifiers 240 and 244 are logically OR'd via diodes 260 and 264, respectively to control the regulation switch 224 at the output of the current source 250. A resistor 270 can be employed to establish a reference voltage that is proportional to I-SENSE generated by current sense 220. The reference voltage can be utilized as a reference to amplifier 240 and as an input reference to outer loop controller and ADC 204.

The amplifier 240 can monitor a plurality of switched inputs at 280, which can be activated to provide one or more selected references to the amplifier. One or more of the references can depend on a variable, such as die temperature. For example, the selected reference can include a charging reference signal input I-1, a pre-charging reference signal input I-2, or a thermal-charging reference signal input I-3, to facilitate control of the regulation switch 224. The inputs at 280 sense current, such as can be converted to voltages for comparison with I-SENSE reference voltage 270 at amplifier 240. The loop controller can include an analog to digital converter (ADC) and can monitor I SENSE and VREG in addition to an external reference voltage VREF to bias the internal workings of the loop controller and ADC.

A selection controller 282 can be provided to switch and select the desired reference from the selection inputs at 280 to the input of the amplifier 240. The selection controller 282 can be provided as part of the loop controller 204 or as a separate controller. As will be shown below and with respect to FIG. 3, the selected reference can also be employed as a reference by another loop controller to regulate VREG based on the selected reference. For example, the input current reference selected at 280 can be monitored by a second loop controller and utilized as a variable reference to adjust differing aspects of a wireless charging system such as temperature, current, voltage, battery charging profile, and so forth.

A feedback signal 290 can be generated by the loop controller 204, wherein such feedback can be provided as a digital signal that can be communicated via inductive primary and secondary elements of the inductively coupled charging circuit 210. As shown, a voltage input signal 294 connected to the battery output voltage can be processed by the loop controller 204. The loop controller 204 measures input voltage VREG and the battery output voltage and drives the input voltage above the output voltage by a suitable amount to operate the regulation switch 224 in saturation.

In an example, the charge controller 234 can be a linear charge controller utilizing input current sense 220. As shown, two analog loops can be OR'd together at the output of current source 250, where one analog loop can regulate current via amplifier 240 and one analog loop can regulate voltage via amplifier 244. The device 200 can provide a wireless control loop to connect a receiver to a transmitter (inside inductively coupled charging circuit 210), wherein the receiver sends commands to the transmitter via feedback 290 to control the receiver input voltage.

As an example, the wireless control loop can operate as follows: the loop controller 204 and ADC can monitor the input voltage, output (battery) voltage, and output current. The loop controller can send feedback 290 to the transmitter in the charging circuit 210 to control the rectifier voltage (see FIG. 4 below) to the desired value. If the charge controller 234 is in current regulation, then the loop controller 204 can send digital packets via feedback 290 to control the rectifier voltage to be above the battery voltage by a given margin that can hold the regulation switch 224 (e.g., FET) in saturation when VDS (voltage drain to source) is greater than VDSAT (drain saturation voltage). In this case, the internal analog loop of the charge controller 234 sets the value of the output current to the battery 230. Similarly, in a pre-charge or thermal fold-back condition, the internal analog loop of the charge controller 234 can set the output current, and the wireless loop thus should control the input voltage to hold the regulation switch 224 in saturation. When voltage regulation is active, then the wireless loop can set the rectifier voltage VREG to a constant level (e.g., 5 V).

Figure 3:
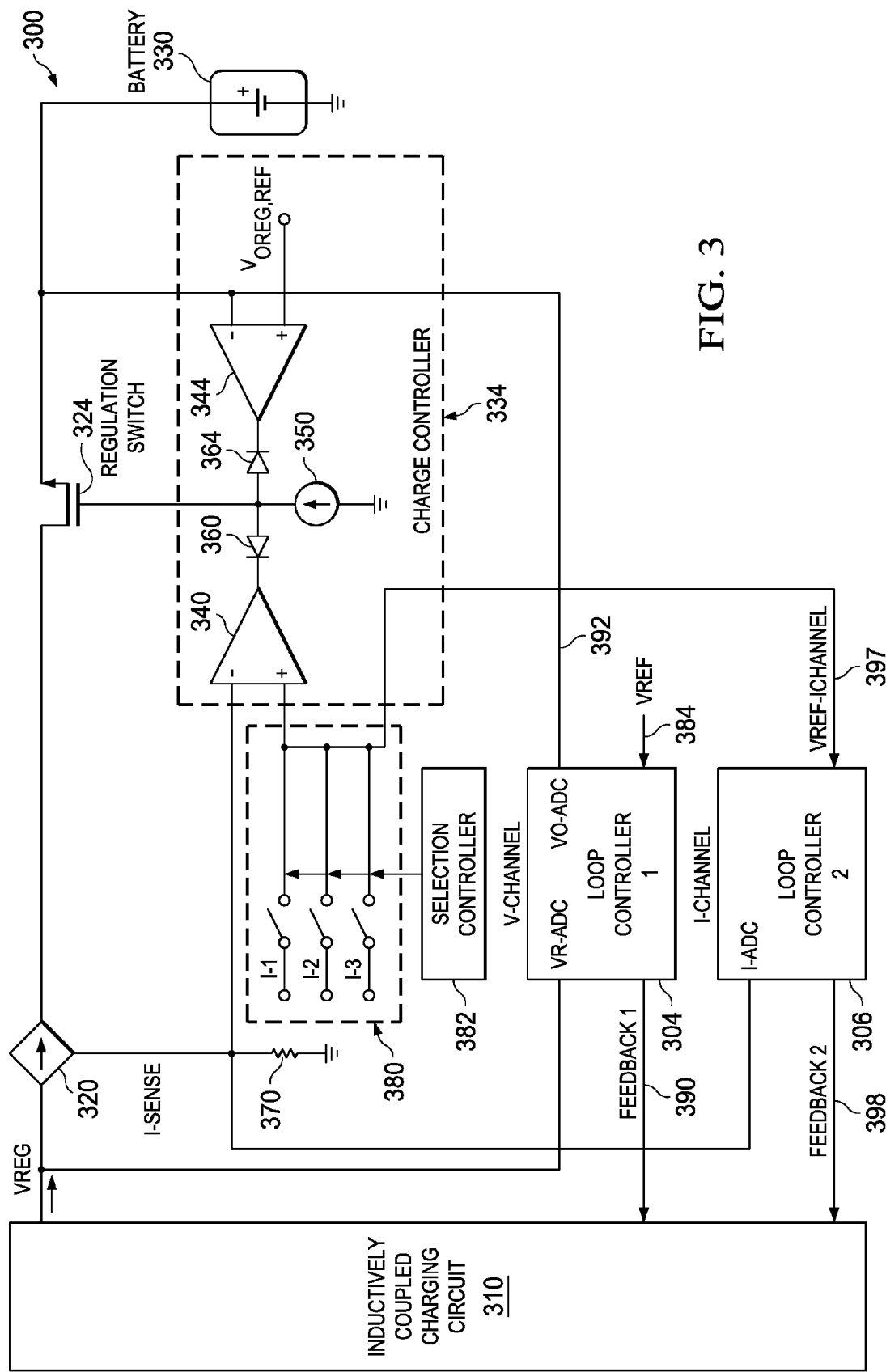
FIG. 3 illustrates an example of an inductively coupled charger device that employs two outer loop controllers to control battery load voltage and current.

FIG. 3 illustrates an example of an inductively coupled charger device 300 that employs two outer loop controllers 304 and 306 to control battery load voltage and current. Similar to the charger in FIG. 2, the charger device 300 includes an inductively coupled charging circuit 310 that generates a regulated DC output voltage VREG. A sense circuit 320 supplies voltage and current to a regulation switch 324 that in turn controls voltage and current delivered to a battery 330. A charge controller 334 controls the regulation switch 324. The charge controller 334 includes an amplifier 340 to monitor current I SENSE and an amplifier 344 that monitors battery output voltage. The charge controller 334 includes a current source 350 (e.g., charge pump) that biases the regulation switch 324. Output from amplifiers 340 and 344 are OR'd via diodes 360 and 364, respectively to control the regulation switch 324 at the output of the current source 350. A resistor 370 can be employed to establish a reference voltage that is proportional to current I SENSE. The reference voltage can be utilized as a reference to amplifier 340 and as an input reference to a first outer loop controller 1 304.

The amplifier 340 can monitor various switched current inputs at 380 and can include a charging reference signal input I-1, a pre-charging reference signal input I-2, or a thermal-charging reference signal input I-3, for example, to facilitate control of the regulation switch 324 during different modes of operation. The inputs at 380 sense current, such as can be converted to voltages for comparison with I-SENSE reference voltage 370 at amplifier 340. A selection controller 382 can be provided to switch and select the desired reference from the selection inputs at 380 that is provided to the input of the amplifier 340. The selection controller 382 can be provided as part of the loop controllers 304 or 306 or as a separate controller. The selected reference at 380 can also be monitored by the second loop controller at 397 for regulating VREG from the charging circuit 310. The selected reference can be fixed or it can vary depend on a variable (e.g., temperature). Thus, the selection controller 382 can select the reference to provide different operating modes such as to control VREG for adjusting differing aspects of a wireless charging system such as die temperature, battery pre-charge current, voltage, a battery charging profile, and so forth for example. For example, initially, the selection controller 382 may select I1 as the switched input 380 to amplifier 340 and as the reference 397. In another phase of circuit operation, I2 may be selected by the selection controller 380 and utilized as a reference 397 for controlling pre-charge current to the battery 330. In yet another example, I3 may be selected by the charge controller and utilized as the reference 397, wherein such current represents another charge variable such as die temperature of the regulation switch. It is to be appreciated that more switched inputs can be employed by the selection controller at 380. For example, a fourth reference current I4 (not shown) could be selected by the selection controller 380 and such current could reflect a battery charging profile current where the current was varied over time to alter the charging characteristics of the battery 330.

The first outer loop controller 1 304 can monitor VREG in addition to an external reference voltage VREF 384 to bias the internal workings of the ADC. A first feedback signal 390 can be generated by the loop controller, wherein such feedback can be provided as a digital signal that is communicated via inductive primary and secondary elements of the inductively coupled charging circuit 310.

As shown, the device 300 can include a second outer loop controller 2 at 306 to monitor current I SENSE and monitor switched input currents 380 via VREF-ICHANNEL input 397. A second feedback 398 is provided to the charging circuit 310 representing control feedback for current. It is noted that the first feedback 390 and the second feedback 398 could alternatively be multiplexed into the same communications channel communicating back to the inductively coupled charging circuit 310.

The reference 397 to the controller 306 enables the feedback message at 398 to be calculated from the internal ADC of the controller and can automatically regulate different variables having different current thresholds (e.g., fast charge or pre-charge) or die temperature. In the system 300, the reference for the internal ADC of controller 306 is provided by I-1, I-2, or I-3 depicted at 380 and can be converted to a reference voltage for the ADC although the current-to-voltage conversion for the reference input 397 is not shown.

In one example, consider if the I-SENSE voltage at 370 were measured with a 7-bit ADC, and the reference voltage 397 for the ADC were from the positive input from amplifier 340. Also, assume that regulation reference voltage for full current I-1 at 380 is 1.28V. If the I-SENSE voltage reaches 1.28V then the regulation switch 324 can regulate current. Also current can be regulated via the wireless loop communicated by the second feedback at 398. One process to achieve this is to set the regulation code in the controller 306 to some value less than the full current defined by I-1. For instance, if the current threshold in the ADC were set to be ADC code 100—which equals 1.00 V in this case since the max code (128)=1.28V. Therefore, when the I-SENSE voltage reaches code 100, messages can be sent to the transmitter, which reduces VREG, which reduces I-SENSE to code 100. In this manner, the regulation switch is in dropout and the analog loop of the charge controller 334 does not control.

In another control aspect of a different variable, when temperature rises above 125 in the regulation switch 324, the reference I-3 at 380 can decrease proportional to the temperature. This voltage may be equal to 0.75V where (1.28-0.75) is an error signal that represents the difference between (Temp_actual−125 C)*scale factor. Since 0.75V is now the reference for the ADC in the controller 306, but the regulation threshold is still code 100, then the new regulation threshold can be (100/128)×0.75=0.59V. Therefore, the wireless loop can now reduce VREG until I-SENSE equals 0.59V, which can automatically regulate temperature. Similarly, the system 300 can switch in a reference voltage equal to a pre-charge reference such as I2 to automatically regulate pre-charge current. Thus, the system 300 supports several control processes and input variables that can regulate multiple variables (e.g., current and temperature, and others) in a manner that is straight-forward to implement and yields stable, monotonic operation.

As shown, the loop controller of FIGS. 1 and 2 can be segmented into an I-channel controller represented as the second controller 306 and V-channel controller represented as the first controller 304. One difference in the charger 300 and the charger 200 depicted in the example of FIG. 2 is in how the feedback messages at 390 and 398 are computed and sent. In the charger of FIG. 2, the feedback can be sent to control the rectifier voltage to a certain level, and to ensure the regulation switch stays in saturation. In the charger 300, the rectifier voltage VREG can still be controlled while the voltage loop is active via amplifier 344. Additionally, the output current can be controlled directly when the current loop is active via amplifier 340.

As a further example, in the charger 300, the output current to the battery 330 can be controlled as follows: In general, the loop controller 2 at 306 can have a certain current reference voltage at 397 (e.g., 1.0V which is below analog loop regulation voltage). When the loop controller 2 at 306 detects that the current has reached a defined regulation threshold, then it can send messages to the transmitter to control the current to this level via feedback 398, irrespective of the actual rectifier voltage.

In practice, the loop controlled by loop controller 306 may be attempting to reduce the output current, thus to perform this function, the loop may have to reduce the rectifier voltage. Since the loop controller 306 current threshold is generally below the analog current regulation threshold, the regulation switch 324 should operate in triode-mode to reach this operating point. This helps to ensure that for a given regulation switch RDS-ON parameter, for example, the receiver should be maximally efficient at any current regulation point.

In some conventional battery chargers, thermal regulation can be implemented by reducing the charge current regulation threshold in proportion to increasing die temperature of the regulation switch, when the die temperature exceeds a certain threshold (e.g., 125° C.), which may be an inefficient and unstable means of operation. In practice, this type of control can drive the output current to a low value while concurrently driving VREG to a high value, which can cause temperature to drop out of the thermal regulation region. This may cause the charge current to return to its original value, which may cause the receiver to enter the thermal regulation region in a subsequent cycle. In this manner, the receiver may oscillate in and out of thermal regulation. In the device 300, such stability and efficiency problems are mitigated with a thermal regulation loop provided by the second loop controller 306, and thus can suitably operate at the thermal limit (e.g., maximum current) for a given system as described below.

Regarding thermal regulation, when the receiver temperature operates above the thermal limit, the current regulation threshold can drop to reduce the charge current via regulation switch 324. Since this voltage is also the reference voltage 397 for the I-channel controller 306, however, the wireless loop can automatically send messages via feedback 398 to the transmitter to reduce the charge current to reduce temperature. In general, the only manner for the system to reduce charge current is to reduce input voltage at the transmitter, which implies receiver power dissipation is reduced. Since the thermal loop operates in a manner that power dissipation is monotonically reduced, this thermal control loop is substantially stable.

Figure 4:
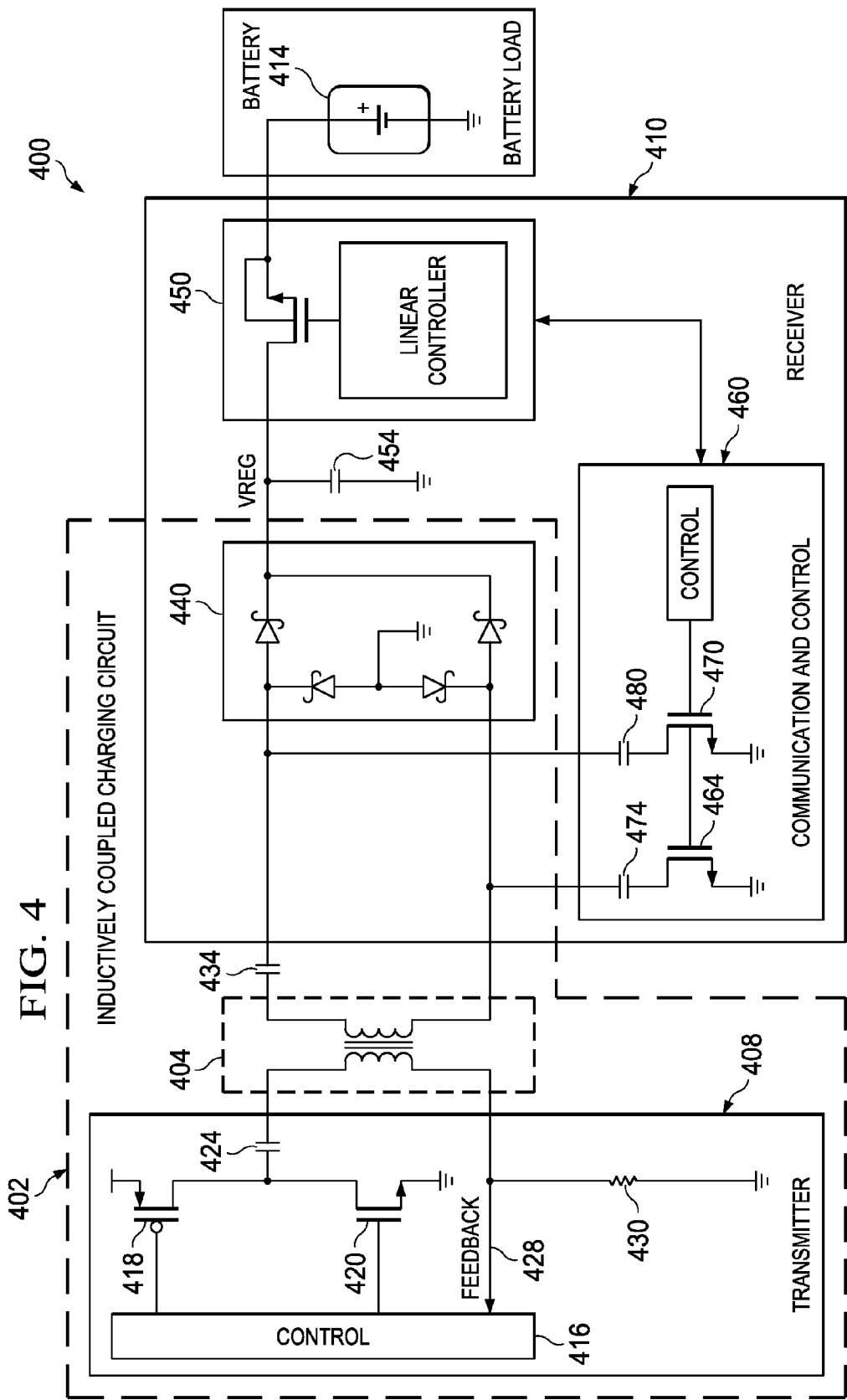
FIG. 4 illustrates an example transmitter and receiver circuit that can be utilized as part of an inductively coupled charger device.

FIG. 4 illustrates an example transmitter and receiver circuit 400 that can be utilized as part of an inductively coupled charger device, such as disclosed herein (e.g., FIGS. 1-3). An inductively coupled charging circuit as previously described in FIGS. 1-3 is represented by dashed line 402. A transformer 404 couples energy between a transmitter 408 and receiver 410 that are employed to charge a battery 414. The transmitter 408 includes a controller 416 (e.g., PID controller) that drives power transistors 418 and 420 which in turn drive the primary side of the transformer 404. An impedance matching capacitor 424 can be provided. Feedback 428 is received from the receiver 410 and can be developed across resistor 430. The receiver 410 can include a matching capacitor 434 which supplies secondary voltage from the transformer 404 to a rectifier 440 to generate rectified DC voltage VREG. The voltage VREG is supplied to a charge controller 450 which regulates voltage and current to the battery 414 via analog controls as previously described. A regulator smoothing capacitor can be provided at 454. As shown, a loop controller 460 (e.g., loop controller 150 of FIG. 1) can be provided which supplies feedback via transistors 464 and 470. Capacitors 474 and 480 can be employed to couple the feedback to the secondary of the transformer 404. The feedback via transistors 464 and 470 can correspond to the feedback 290 shown in FIG. 2.

Figure 5:
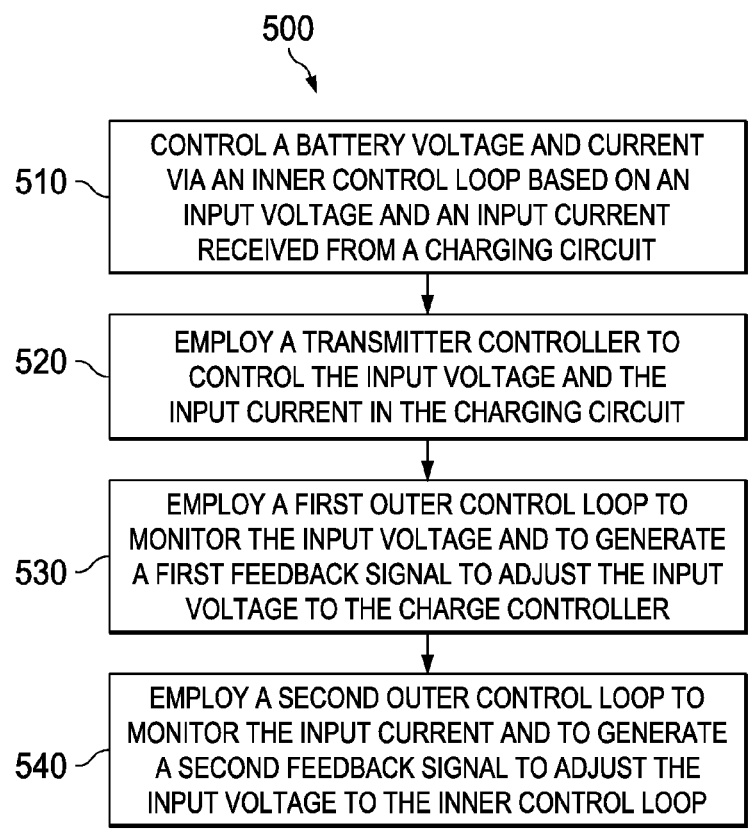
FIG. 5 illustrates an example method for charging a battery via inductively coupled charging.

In view of the foregoing structural and functional features described above, an example method will be better appreciated with reference to FIG. 5. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 5 illustrates an example method for charging a battery via inductively coupled charging. Proceeding to 510, the method 500 includes controlling a battery voltage and current via an inner control loop (e.g., charge controller 140 of FIG. 1) based on an input voltage and an input current received from a charging circuit at 510. At 520, the method 500 includes employing a transmitter controller (e.g., controller 416 of FIG. 4) to control the input voltage and the input current in the charging circuit. At 530, the method 500 includes employing a first outer control loop (e.g., controller 304 of FIG. 3) to monitor the input voltage and to generate a first feedback signal to adjust the input voltage to the charge controller. At 540, the method 500 includes employing a second outer control loop (e.g., controller 306 of FIG. 3) to monitor the input current and to generate a second feedback signal to adjust the input voltage to the inner control loop. The transmitter controller can utilize a PID loop to control the input voltage and the input current in the charging circuit, for example. The method 500 can also include utilizing a regulation switch to control the battery voltage.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A device, comprising:
   a charge controller to regulate an output voltage for charging a battery based on an input voltage and an input current received from an inductively coupled charging circuit, the charge controller regulating the output voltage based on a selected one of a plurality of references;
   a loop controller that monitors at least one of the input voltage or the input current to generate a feedback signal to the inductively coupled charging circuit to adjust the input voltage;
   wherein the loop controller is a first loop controller that provides a first feedback signal to the inductively coupled charging circuit based on the input voltage relative to a voltage reference, the device further comprising a second loop controller configured to provide a second feedback signal to the inductively coupled charging circuit to regulate the input current based on the input current relative to the selected reference;
   wherein the inductively coupled charging circuit is configured to execute a control algorithm to process the first feedback signal and the second feedback signal to adjust the input voltage to the charge controller; and
   further comprising a selection controller configured to select at least one of the plurality of references that is utilized by the charge controller and the second loop controller.

2. The device of claim 1, wherein the at least one of the plurality of references corresponds to a variable representing at least one of a charging reference, a pre-charging reference, or temperature.

3. The device of claim 1, further comprising a regulation switch configured to regulate the output voltage to the battery according to the input voltage from the inductively coupled charging circuit and based on a control signal from the charge controller that is driven by the charge controller.

4. The device of claim 3, the charge controller further comprising a first amplifier to monitor current and a second amplifier to monitor voltage, where outputs of the respective amplifiers are connected in a wired-OR configuration to control the regulation switch.

5. The device of claim 4, further comprising a current source to supply current to the wired-OR configuration to facilitate control of the regulation switch.

6. The device of claim 4, wherein the first amplifier to monitor current receives at least one input, corresponding to the selected one of the plurality of references, which includes a charging reference signal, a pre-charging reference signal, or a thermal-charging reference signal to facilitate control of the regulation switch.

7. The device of claim 1, wherein the first loop controller further comprises an analog-to-digital converter to supply a reference voltage for the charge controller and the feedback signal to the inductively coupled charging circuit.

8. A device, comprising:
   a charge controller to regulate a battery based on an input voltage and an input current received from an inductively coupled charging circuit;
   a first loop controller configured to monitor the input voltage to generate a first feedback signal to adjust the input voltage to the charge controller; and a second loop controller configured to generate a second feedback signal to adjust the input voltage to the charge controller, the second loop controller generating the second feedback signal based on the input current relative to a reference that is selected from a plurality of references to adjust a control variable;

further comprising a regulation switch that receives the input voltage to regulate voltage and current at the battery based on a control signal from the charge controller;

wherein the charge controller further comprises a current sense amplifier to monitor input current relative to the selected reference and a voltage sense amplifier to monitor output voltage to control the regulation switch; and further comprising a selection controller configured to control which of the plurality of references is the provided as a reference signal to the current sense amplifier, the selected reference signal corresponding to a charging reference signal, a pre-charging reference signal, or a thermal-charging reference signal to control of the regulation switch.

9. The device of claim 8, further comprising a current source to bias the regulation switch.

10. The device of claim 8, the charging circuit further comprising a transmitter circuit and a receiver circuit that inductively couples energy to provide the input voltage to the charge controller and to receive the first and second feedback signals from the first and second loop controllers.

11. The device of claim 10, the transmitter circuit executes a PID (proportional-integral-derivative) algorithm to control voltages and currents based on the first feedback signal and second feedback signal of claim 8.

* * * * *